(12) United States Patent
Schweid et al.

(10) Patent No.: US 11,483,435 B2
(45) Date of Patent: Oct. 25, 2022

(54) MACHINE STATE AND DEFECT DETECTION META DATA TO EXECUTE MAINTENANCE ROUTINES ON A MULTI-FUNCTION DEVICE

(71) Applicant: Xerox Corporation, Norwalk, CT (US)

(72) Inventors: Stuart A. Schweid, Pittsford, NY (US); Martin L. Frachioni, Rochester, NY (US); David A. Vankouwenberg, Avon, NY (US); David M. Gurak, Webster, NY (US); Christopher Mieney, Lima, NY (US)

(73) Assignee: Xerox Corporation, Norwalk, CT (US)

( * ) Notice: Subject to any disclaimer, the term of this patent is extended or adjusted under 35 U.S.C. 154(b) by 71 days.

(21) Appl. No.: 17/129,811

(22) Filed: Dec. 21, 2020

(65) Prior Publication Data

US 2022/0201129 A1    Jun. 23, 2022

(51) Int. Cl.
*H04N 1/00* (2006.01)
*G06N 20/00* (2019.01)

(52) U.S. Cl.
CPC ........ *H04N 1/00029* (2013.01); *G06N 20/00* (2019.01); *H04N 1/00037* (2013.01); *H04N 1/00344* (2013.01)

(58) Field of Classification Search
None
See application file for complete search history.

(56) References Cited

U.S. PATENT DOCUMENTS

| | | | |
|---|---|---|---|
| 6,282,687 B1 * | 8/2001 | Maeda | H04N 1/0009 |
| | | | 714/763 |
| 10,198,809 B2 | 2/2019 | Schweid et al. | |
| 10,216,565 B2 | 2/2019 | Cunico et al. | |
| 10,404,868 B2 | 9/2019 | Spivakovsky et al. | |
| 10,831,417 B1 | 11/2020 | Su | |
| 2010/0303281 A1 * | 12/2010 | Wu | B41J 2/2142 |
| | | | 347/15 |
| 2012/0013935 A1 * | 1/2012 | Adachi | B41J 2/2135 |
| | | | 358/1.14 |
| 2015/0227838 A1 * | 8/2015 | Wang | G06F 11/008 |
| | | | 706/12 |
| 2020/0134373 A1 | 4/2020 | Oikawa et al. | |
| 2020/0361210 A1 | 11/2020 | Sato et al. | |
| 2020/0393998 A1 | 12/2020 | Su | |
| 2021/0114368 A1 | 4/2021 | Ukishima | |
| 2021/0285672 A1 * | 9/2021 | Samusevich | G05B 23/0283 |
| 2021/0287353 A1 | 9/2021 | Soltwedel et al. | |

* cited by examiner

*Primary Examiner* — Eric A. Rust (57) ABSTRACT

A method is disclosed. For example, the method executed by a processor of a multi-function device (MFD) includes tracking a machine state of the MFD, predicting a potential defect based on a determination that the machine state is associated with a defect class of a plurality of different defect classes, determining a maintenance routine associated with the defect class, and executing the maintenance routine to prevent the potential defect.

14 Claims, 5 Drawing Sheets

MACHINE STATE AND DEFECT DETECTION META DATA TO EXECUTE MAINTENANCE ROUTINES ON A MULTI-FUNCTION DEVICE

The present disclosure relates generally to multi-function devices (MFDs), and relates more particularly to automatically executing a maintenance routine based on machine state and defect detection metadata.

BACKGROUND

Multi-function devices (MFDs) are used to process print jobs. An MFD can perform a variety of different functions including printing, scanning, copying, faxing, and the like.

As the MFDs operate, various defects may appear in electronic documents that are scanned and reproduced. For example, defects can include blurred images, spots, missing lines, random spots, and the like. Defects are undesirable and may detract from the overall quality of the print.

There are some defect detection algorithms that can detect defects compared to an original electronic image or a desired image. For example, the defect detection algorithms can compare differences between the reproduced image and the original image to detect defects. However, these defect detection algorithms cannot predict when defects will occur or be used to automatically execute maintenance routines on the MFD to eliminate the defects.

SUMMARY

According to aspects illustrated herein, there are provided a method and a non-transitory computer readable medium for executing a maintenance routine based on a defect class associated with a machine state. One disclosed feature of the embodiments is a method, executed by a processor of the MFD, that comprises tracking a machine state of the MFD, predicting a potential defect based on a determination that the machine state is associated with a defect class of a plurality of different defect classes, determining a maintenance routine associated with the defect class, and executing the maintenance routine to prevent the potential defect.

Another disclosed feature of the embodiments is a non-transitory computer-readable medium having stored thereon a plurality of instructions, the plurality of instructions including instructions which, when executed by a processor, cause the processor to perform operations to track a machine state of the MFD, predict a potential defect based on a determination that the machine state is associated with a defect class of a plurality of different defect classes, determine a maintenance routine associated with the defect class, and execute the maintenance routine to prevent the potential defect.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and apparatus to automatically execute a maintenance routine on a multi-function device (MFD) based on a defect class associated with a machine state. As discussed above, MFDs may generate defects in images or reproduced electronic documents.

As noted above, there are some defect detection algorithms that can detect defects compared to an original electronic image or a desired image. However, the current defect detection algorithms cannot be used to predict defects and automatically execute maintenance routines to prevent the predicted defects.

The present disclosure uses machine learning to predict potential defects based on a machine state. The machine state may be any quantifiable state of the MFD that may affect the quality of the image. Various machine states may be associated with different defect classes. A defect may be predicted when a machine state is reached that is associated with a particular defect class above a probability threshold. In response, the MFD may automatically execute a maintenance routine to prevent the predicted defect. The machine state may be reset and the process may be continued to continuously predict and prevent defects in the images produced by the MFD.

Figure 1:
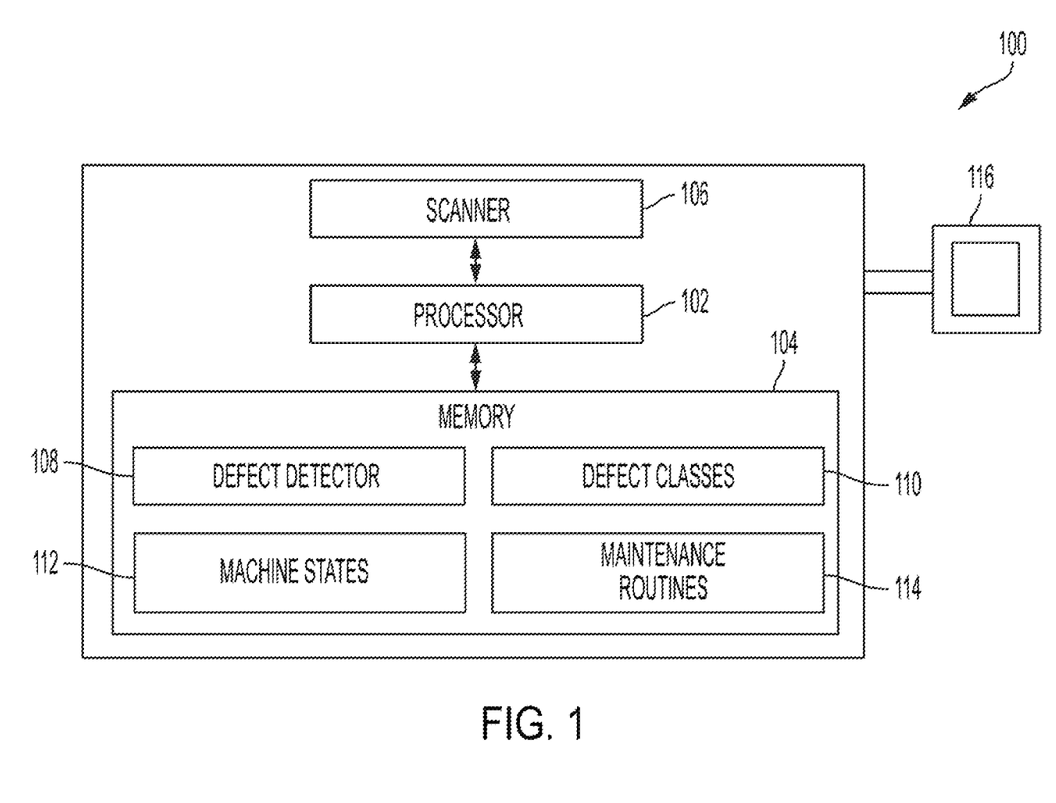
FIG. 1 illustrates a block diagram of an MFD of the present disclosure.

FIG. 1 illustrates an example MFD 100 of the present disclosure. It should be noted that the MFD 100 has been simplified for ease of explanation and may include additional components that are not shown. For example, the MFD 100 may include a paper tray, printing modules (e.g., a paper path, printheads or toner drums, etc.), finishing modules, communication interfaces, paper output trays, and the like.

In one embodiment, the MFD 100 may include a processor 102, a memory 104, a scanner 106, and a user interface 116. The processor 102 may be communicatively coupled to the memory 104 and the scanner 106. The processor 102 may execute instructions stored in the memory 104 to perform the operations described herein. The processor 102 may also control the operation of the scanner 106 to scan documents. The electronic image of the scanned document can be analyzed to detect defects as part of a training phase, create defect classifiers from the training phase, and predict potential defects based on the defect classifiers and a machine state of the MFD 100.

In one embodiment, the user interface 116 may be a graphical user interface (GUI) with a touch screen. In one embodiment, the user interface 116 may include a display with physical buttons to navigate menus and select options.

In one embodiment, the memory 104 may be a non-transitory computer readable storage medium. For example, the memory 104 may be a hard disk drive, a solid-state drive, a random access memory (RAM), a read-only memory (ROM), and the like.

In one embodiment, the memory 104 may store a defect detector 108, defect classes 110, machine states 112, and maintenance routines 114. The defect detector 108 may be instructions associated with a method to detect defects on a scanned image of a document. The defect detector 108 may analyze the scanned image and draw defect bounding boxes around the defects. Metadata associated with the defect bounding boxes may be collected for each document that is scanned and analyzed.

In one embodiment, the defect bounding box metadata may be a vector. For example, the vector may include multiple values associated with the bounding box. For example, the vector may include a value for a width, a height, and a location (e.g., a center coordinate of the bounding box).

Figure 2:
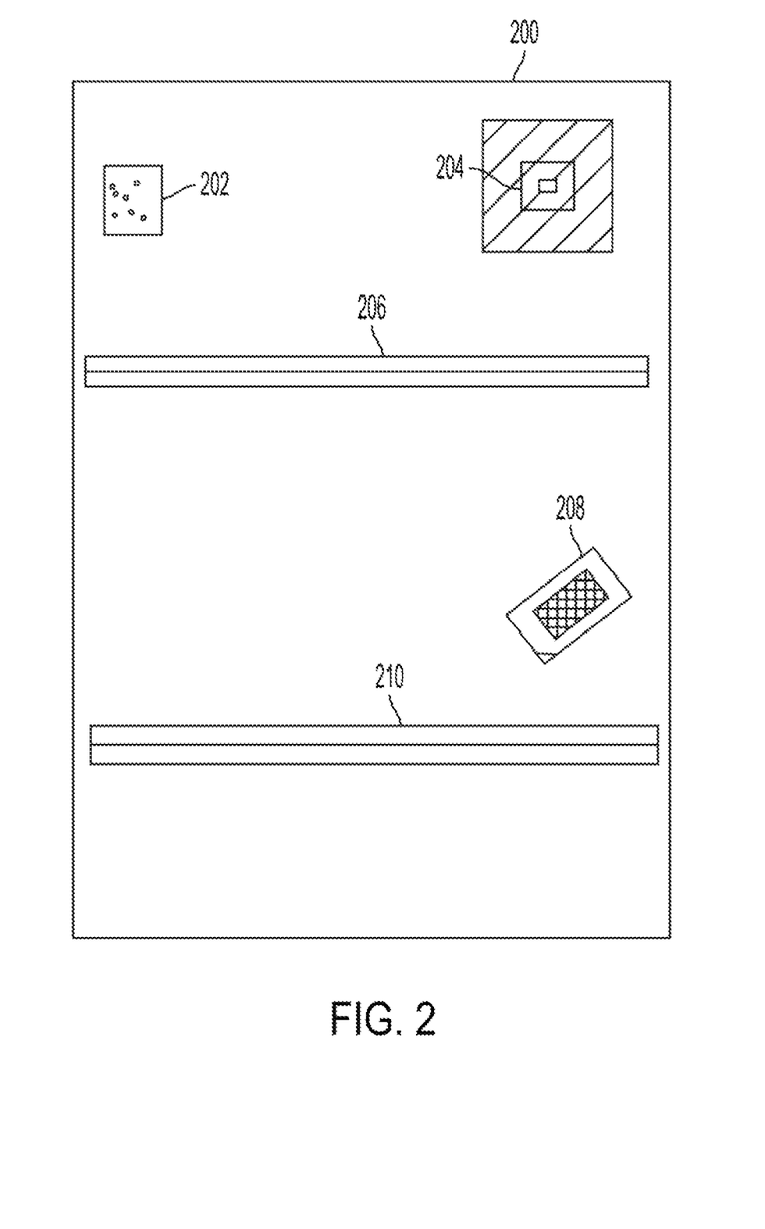
FIG. 2 illustrates an example of bounding boxes that can be drawn around defects on an electronic image of the present disclosure.

FIG. 2 illustrates an example of defect bounding boxes that can be drawn around defects on an electronic image 200 of a document (e.g., a scanned image of a document). FIG. 2 illustrates a few examples of defects that can be detected. However, it should be noted other types of defects that are not illustrated in FIG. 2 may be detected.

FIG. 2 illustrates example defect bounding boxes 202, 204, 206, 208, and 210 that can be drawn around defects that are detected by the defect detector 108. Each defect may be associated with different defect bounding box metadata. For example, the defect bounding box 202 may be drawn around dark spots. The defect bounding box 202 may have a metadata vector with particular width, height, and location. The dark spots may be associated with a dirty transport roller.

The defect bounding box 204 may be associated with a missing portion of an image. The defect bounding box 204 may have a metadata vector with a particular width, height, and location. The missing portion may be associated with a defective print nozzle.

The defect bounding boxes 206 and 210 may be associated with a dark line that runs across the width of the electronic image 200. The defect bounding boxes 206 and 210 may have a metadata vector with a particular width, height, and location. The dark line may be associated with a defecting light in an optical scanner array.

The defect bounding box 208 may be associated with a dark patch in the electronic image 200. The defect bounding box 208 may have a particular width, height, and location. The dark patch may be associated with a dirty transport roller, debris on the platen glass blocking the optical scanner, a malfunction of a printhead at the location of the defect bounding box 208, and the like.

In one embodiment, the defect bounding boxes generated around defects detected in electronic or scanned images may be analyzed to create the defect classes 110. For example, defect bounding boxes with similar metadata vectors may be grouped together to form a defect class. In other words, defect bounding boxes having particular metadata vector values may be associated with a particular defect.

Figure 3:
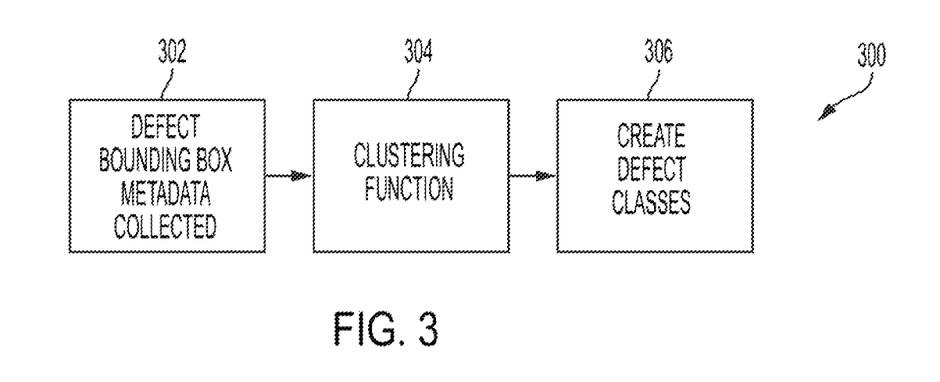
FIG. 3 illustrates a flow diagram of how the defects are organized into a number of defect classes.

FIG. 3 illustrates an example flow chart 300 that may be part of a training phase. At block 302, defect bounding box metadata may be collected. In one embodiment, the defect bounding box metadata may be collected from thousands of electronic images or scanned images that are generated as part of the training phase. For example, the training phase may be performed by the manufacturer before the MFD is deployed for use at an office location.

In one embodiment, the training phase may collect the defect bounding box metadata over time as the MFD is used. In other words, the MFD may be deployed in an office environment. As users print and/or scan images over time, each image may be analyzed by the defect detector 108 to generate defect bounding boxes. The metadata associated with the defect bounding boxes may be collected over time.

At block 304, a clustering function may be applied to group defect bounding boxes with similar metadata values together. In one embodiment, the clustering function may be a centroid model such as a K-means clustering function. The types of defects may be known a priori and the K-means clustering function may be used to group defect bounding boxes into one of the known defect classes. In other words, the number of defect classes may be predefined based on the known defects. In one embodiment, the number of defect classes may be determined using an optimization method such as the elbow method, X-means clustering, rate distortion, and the like. It should be noted that other clustering functions may be used such as distribution based clustering functions, density based clustering functions, and the like.

At block 306, the defect classes 110 may be created. For example, a plurality of different defect classes may be created or defined at block 306. Each defect class may identify a particular defect based on defect bounding boxes having a certain metadata vector values.

In one embodiment, different machine states of the MFD 100 may be associated with particular defect classes. The machine state may be a value associated with any parameter of the MFD 100 that may affect an image quality of the electronic image 200. For example, the machine state may include an amount of time since ink or toner was replaced, a number of pages that have been printed since a transport roller was cleaned, an amount of time since a light array of an optical scanner was replaced, an amount of time since print nozzles on a printhead were cleaned, and the like.

Figure 4:
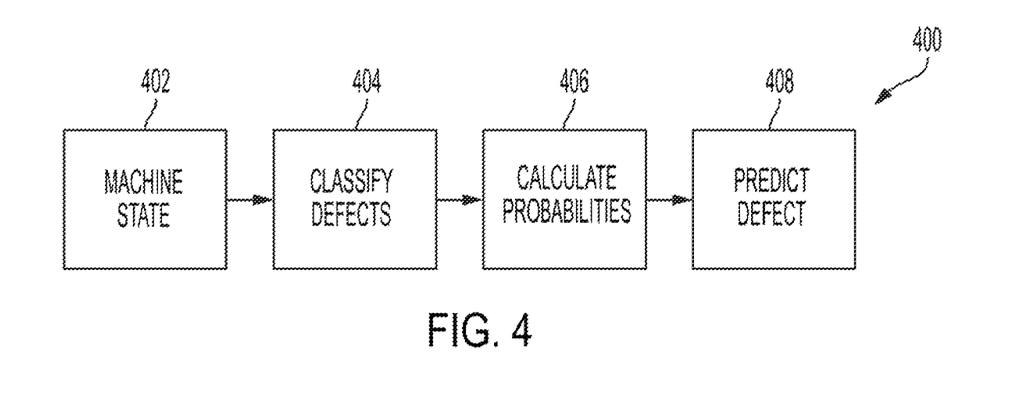
FIG. 4 illustrates a flow diagram of how probabilities of a defect class can be calculated for a machine state of the present disclosure.

FIG. 4 illustrates a flow diagram 400 that illustrate how defects can be trained based on a machine state to predict defects. At block 402, the machine states may be identified. The identified machine states may be tracked and stored in the memory 104 as shown by machine states 112 illustrated in FIG. 1.

At block 404, the machine states may be classified to one of the defect classes that were created in block 306 of the flow diagram 300. In one embodiment, a supervised machine learning method may be used to classify the machine states to particular defect classes. An example of a supervised machine learning method may include a state vector machine (SVM) approach that calculates a soft membership to each class as a probability value between 0 and 1. The SVM may be set up using a linear kernel, but can be enhanced to a Gaussian (or any other non-linear) kernel if results are not sufficient using a linear kernel. The SVM value may be set as a threshold value for the machine state being associated with a particular defect class.

At block 406, probabilities can be calculated for each defect class given a machine state. For example, after the SVM for each defect class output is trained, a softmax function can be applied to convert the SVM classifier outputs to a probability distribution that a given machine state is part of a particular defect class.

At block 408, a defect may be predicted for a given machine state based on the calculated probabilities. For example, once the defect class probability vector starts to show larger membership in a particular defect class (e.g., according to the softmax probability distribution), the likely defect may be predicted for that machine state.

Referring back to FIG. 1, the machine states 112 may track machine states of the MFD 100 while in operation. The values of the machine states 112 may be stored in the memory 104. When, the value of the machine states 112 reaches a state that has a calculated probability that exceeds a threshold for a given defect class, then the processor 102 may predict that the defect may occur.

In one embodiment, a maintenance routine associated with the defect may be executed by the processor 102 in response to the predicted defect. The maintenance routine may be one of the maintenance routines 114 stored in the memory 104. The maintenance routines 114 may include instructions to perform a maintenance routine to clear or prevent the defect that is predicted given a particular machine state.

In one embodiment, the maintenance routines 114 may include a missing jet detection, a missing jet correction, a purge operation, a uniformity correction, a missing light source detection, a cleaning operation, and the like. For example, the missing jet correction may identify a jet that is malfunctioning and may cause a spot on an image without ink. The purge operation may clear a blocked print nozzle or jet that may cause a spot on an image without ink. A uniformity correction may align the print nozzles that may otherwise cause a blurry image due to misalignment. The missing light source detection may identify a particular light emitting diode (LED) in an optical sensor array causing black spots to appear on the scanned image. The cleaning operation may clean a transport roller to remove residual ink and/or toner to prevent random spot defects or lines.

In one embodiment, the user interface 116 may display a message in response to the predicted defect. The message may indicate to the user that a maintenance routine is being executed and that operation has temporarily been paused until the maintenance routine is completed. The message may indicate the defect that is predicted and maintenance routine that is being performed.

In one embodiment, the message may present a user with an option to continue with a print job or a scan job despite the predicted defect. For example, the potential defect may be relatively minor (e.g., small black dots). The user may want to continue if a high quality image is not necessary for a particular print job or scan job. Thus, the user may select to continue, and the routine maintenance can be performed after the user has completed his or her print job or scan job.

In one embodiment, after the routine maintenance is performed, the values of a particular machine state affected by the routine maintenance may be reset to zero or to a default value. For example, a purge operation may reset a time value associated with the purge operation back to zero. In another example, if a missing jet detection identified a bad jet, the jet may be replaced. Then a time value since replacement for the jet may be reset to zero. In another example, if the cleaning operation is performed to clean a transport roller, then a number of copies made since cleaning the transport roller may be reset to 5,000 (e.g., the counter may count down to zero from 5,000), and so forth.

As a result, the MFD 100 of the present disclosure may be trained to predict a potential defect before the defect occurs. The defect may be predicted using machine learning to train the processor 102 to associate a particular machine state with different defect classes that are created during a training phase. A defect may be predicted when the probability of a machine state belonging to a particular defect class of the defect exceeds a threshold.

Figure 5:
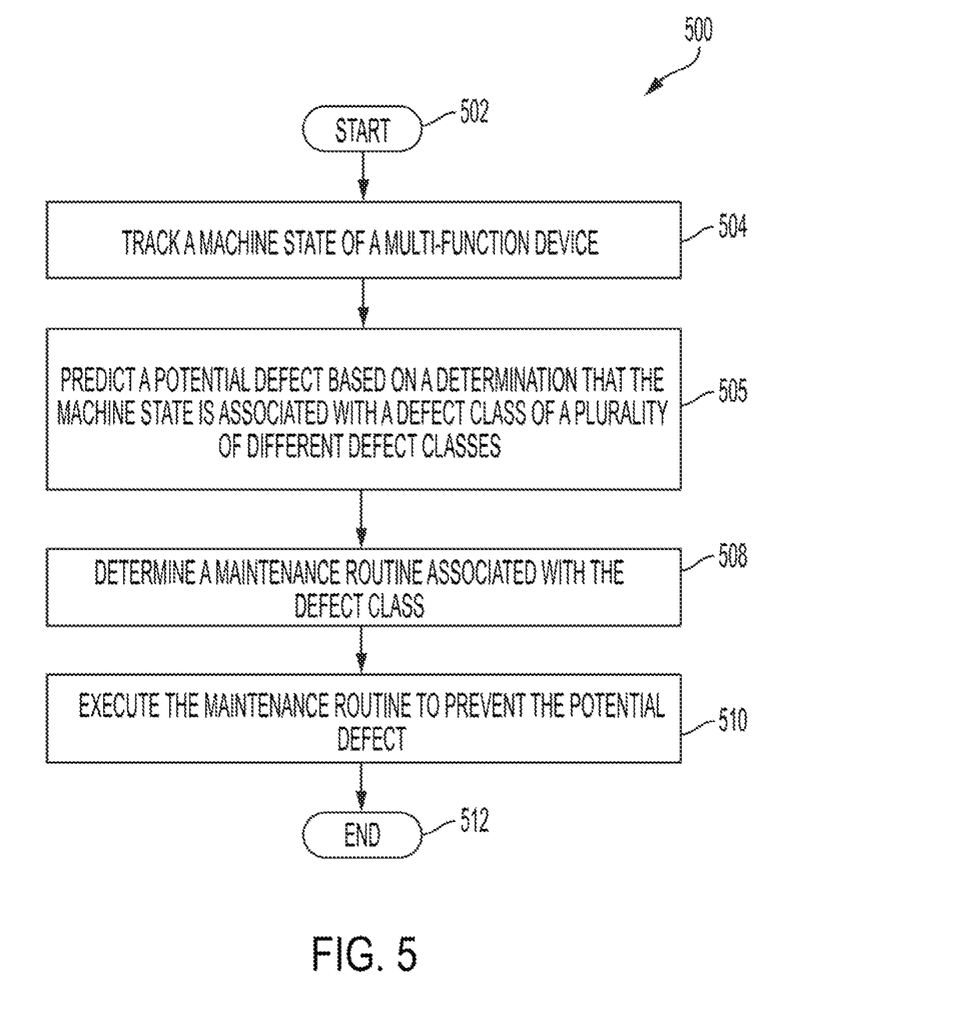
FIG. 5 illustrates an example flow chart of a method for executing a maintenance routine based on a defect class associated with a machine state of the present disclosure.

FIG. 5 illustrates an example flow chart of a method 500 for executing a maintenance routine based on a defect class associated with a machine state of the present disclosure. In one embodiment, the method 500 may be performed by the MFD 100 or by an apparatus, such as the apparatus 600 illustrated in FIG. 6 and discussed below.

In one embodiment, the method 500 begins at block 502. At block 504, the method 500 tracks a machine state of the MFD. For example, values associated with a machine state that may affect image quality may be tracked or monitored as the MFD is being used. The values associated with the machine state or states may be stored in memory.

At block 506, the method 500 predicts a potential defect based on a determination that the machine state is associated with a defect class of a plurality of different defect classes. In one embodiment, the potential defect may be predicted by calculating, for each one of the plurality of different defect classes, a probability that the machine state is associated with a respective defect class. For example, if there are ten defect classes, a probability that the machine state belongs a first defect class may be calculated, a probability that the machine state belongs to the second defect class may be calculated, and so forth, for all ten defect classes. In other words, ten different probabilities may be calculated (e.g., one probability for each of the ten defect classes). In one embodiment, the probabilities may be calculated using a softmax function.

Then, the probability of the machine state being associated with a defect class of the plurality of different defect classes being greater than a threshold may be determined. The threshold may be a value between 0 and 1 that is calculated during a training phase, as described above. In one embodiment, the threshold may be predefined to be a particular value (e.g., greater than 0.80, 0.90, 0.95, and the like).

In one embodiment, the plurality of different defect classes may be created during a training phase. The number of different defect classes may be predetermined or may be determined using an optimization function.

For example, the training phase may include, for each image that is produced, analyzing the image to detect defects. Defect bounding boxes may be generated around the defects that are detected. Then, the plurality of different defect classes may be created using a K-means cluster function that groups defect bounding box metadata for each document into one of the plurality of different defect classes.

An example of the defect bounding boxes is illustrated in FIG. 2, and discussed above. An example of how the defect classes are created is illustrated in the flow chart 300 illustrated in FIG. 3, and discussed above.

Each machine state of the MFD may be trained to be associated with a particular defect class. The flow chart 400 illustrated in FIG. 4, and discussed above, describes an example of how the defect classes can be trained.

At block 508, the method 500 determines a maintenance routine associated with the defect class. For example, a maintenance routine that is associated with clearing or preventing the predicted defect may be selected to be executed. The maintenance routines may include a missing jet detection, a missing jet correction, a purge operation, a uniformity correction, a missing light source detection, a cleaning operation, and the like.

At block 510, the method 500 executes the maintenance routine to prevent the potential defect. In one embodiment, after the maintenance routine is executed, the machine state associated with the predicted defect may be reset to zero or to a default starting value. At block 512, the method 500 ends.

Figure 6:
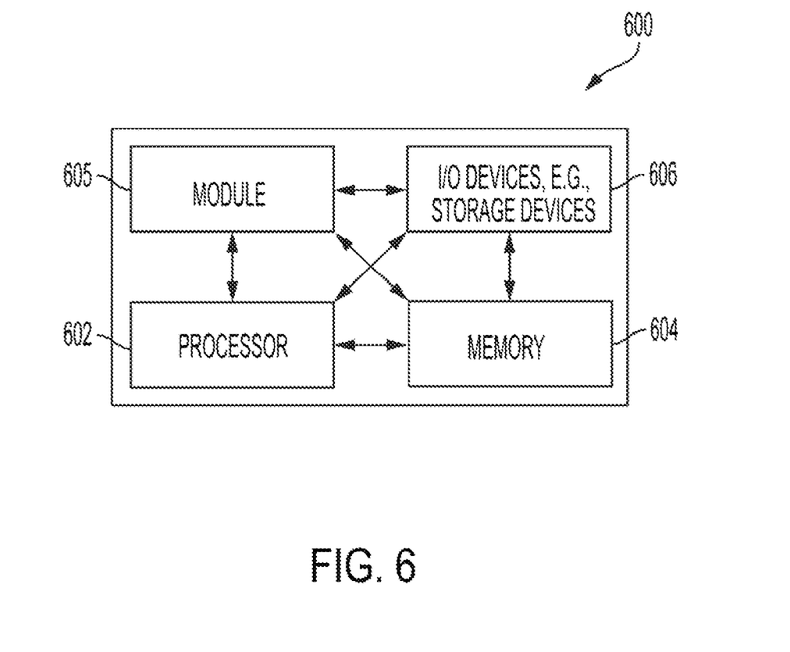
FIG. 6 illustrates a high-level block diagram of an example computer suitable for use in performing the functions described herein.

FIG. 6 depicts a high-level block diagram of a computer that is dedicated to perform the functions described herein. As depicted in FIG. 6, the computer 600 comprises one or more hardware processor elements 602 (e.g., a central processing unit (CPU), a microprocessor, or a multi-core processor), a memory 604, e.g., random access memory (RAM) and/or read only memory (ROM), a module 605 for executing a maintenance routine based on a defect class associated with a machine state, and various input/output devices 606 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 605 for a method for executing a maintenance routine based on a defect class associated with a machine state (e.g., a software program comprising computer-executable instructions) can be loaded into memory 604 and executed by hardware processor element 602 to implement the steps, functions or operations as discussed above. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 605 for executing a maintenance routine based on a defect class associated with a machine state (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method, comprising:
   tracking, by a processor of a multi-function device (MFD), a machine state of the MFD;
   predicting, by the processor, a potential defect based on a determination that the machine state is associated with a defect class of a plurality of different defect classes, wherein the predicting comprises:
      calculating, by the processor, for each respective defect class of the plurality of different defect classes, a probability that the machine state is associated with the respective defect class, wherein the plurality of different defect classes is generated during a training phase operation of the MFD, wherein the training phase operation comprises:
         for each image that is produced, analyzing, by the processor, the each image to detect defects;
         generating, by the processor, a defect bounding box around the defects that are detected; and
         creating, by the processor, the plurality of different defect classes using a K-means cluster function that groups defect bounding box metadata for the each image into one of the plurality of different defect classes;
      determining, by the processor, that the probability that the machine state is associated with the defect class of the plurality of different defect classes is greater than a threshold;
   determining, by the processor, a maintenance routine associated with the defect class; and
   executing, by the processor, the maintenance routine to prevent the potential defect.

2. The method of claim 1, wherein the calculating is performed with a softmax function.

3. The method of claim 1, further comprising:
   associating, by the processor, the plurality of different defect classes with different machine states.

4. The method of claim 1, wherein a number of the plurality of different defect classes is pre-defined or determined using an optimization function.

5. The method of claim 1, further comprising:
   resetting, by the processor, the machine state after the maintenance routine is executed.

6. The method of claim 1, wherein the machine state comprises a quantifiable state of the MFD that affects a quality of an image that is produced by the MFD.

7. The method of claim 1, wherein the maintenance routine comprises at least one of: a missing jet detection, a missing jet correction, a purge operation, or a uniformity correction.

8. A non-transitory computer-readable medium storing a plurality of instructions, which when executed by a processor of a multi-function device (MFD), causes the processor to perform operations, comprising:
   tracking a machine state of the MFD;
   predicting a potential defect based on a determination that the machine state is associated with a defect class of a plurality of different defect classes, wherein the predicting comprises:
      calculating, for each respective defect class of the plurality of different defect classes, a probability that the machine state is associated with the respective defect class, wherein the plurality of different defect classes is generated during a training phase operation of the MFD, wherein the training phase operation comprises:

for each image that is produced, analyzing the each image to detect defects;

generating a defect bounding box around the defects that are detected; and creating the plurality of different defect classes using a K-means cluster function that groups defect bounding box metadata for the each image into one of the plurality of different defect classes;

determining that the probability that the machine state is associated with the defect class of the plurality of different defect classes is greater than a threshold;

determining a maintenance routine associated with the defect class; and executing the maintenance routine to prevent the potential defect.

9. The non-transitory computer-readable medium of claim 8, wherein the calculating is performed with a softmax function.

10. The non-transitory computer-readable medium of claim 8, further comprising:

associating the plurality of different defect classes with different machine states.

11. The non-transitory computer-readable medium of claim 8, wherein a number of the plurality of different defect classes is pre-defined or determined using an optimization function.

12. The non-transitory computer-readable medium of claim 8, further comprising:

resetting the machine state after the maintenance routine is executed.

13. The non-transitory computer-readable medium of claim 8, wherein the maintenance routine comprises at least one of: a missing jet detection, a missing jet correction, a purge operation, or a uniformity correction.

14. A method, comprising:

performing, by a processor of a multi-function device (MFD), a training operation to generate a plurality of different defect classes based on defect bounding box metadata generated around identified defects on an image produced by the MFD;

associating, by the processor, different machine states of the MFD with the plurality of different defect classes;

tracking, by the processor, a machine state of the MFD;

calculating, by the processor, a probability that the machine state is associated with defect class for each one of the plurality of different defect classes;

determining, by the processor, that the probability of a defect class of the plurality of different defect classes is above a threshold;

predicting, by the processor, a potential defect associated with the defect class in response to the determining;

identifying, by the processor, a maintenance routine associated with the defect class; and executing, by the processor, the maintenance routine to prevent the potential defect.

* * * * *